July 11, 1944.     O. MUELLER     2,353,488
HYDRAULIC PUNCH AND STRIPPER
Filed May 24, 1943     2 Sheets-Sheet 1
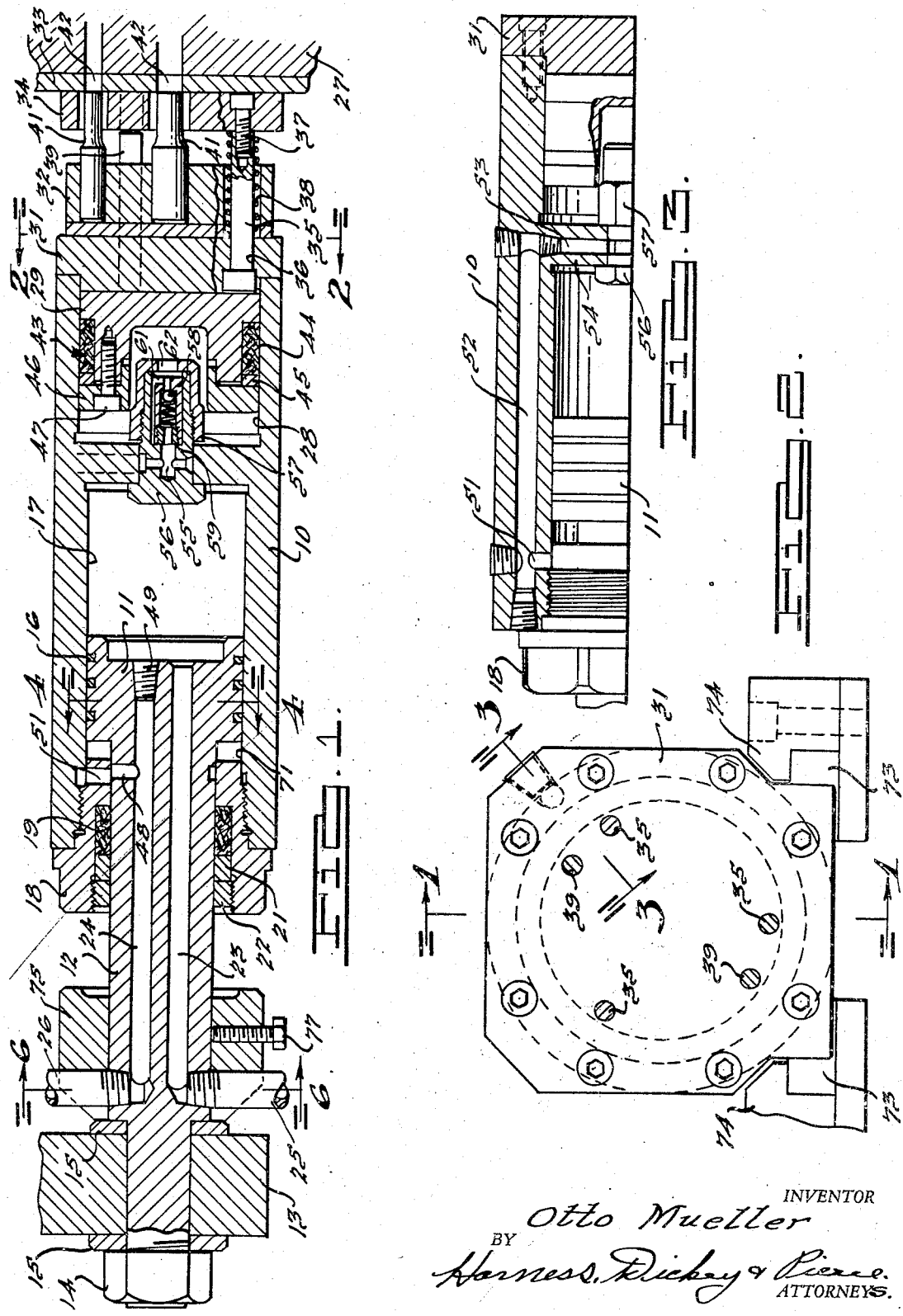
INVENTOR
Otto Mueller
BY
Harness, Dickey & Pierce
ATTORNEYS.

July 11, 1944.     O. MUELLER     2,353,488
HYDRAULIC PUNCH AND STRIPPER
Filed May 24, 1943     2 Sheets-Sheet 2
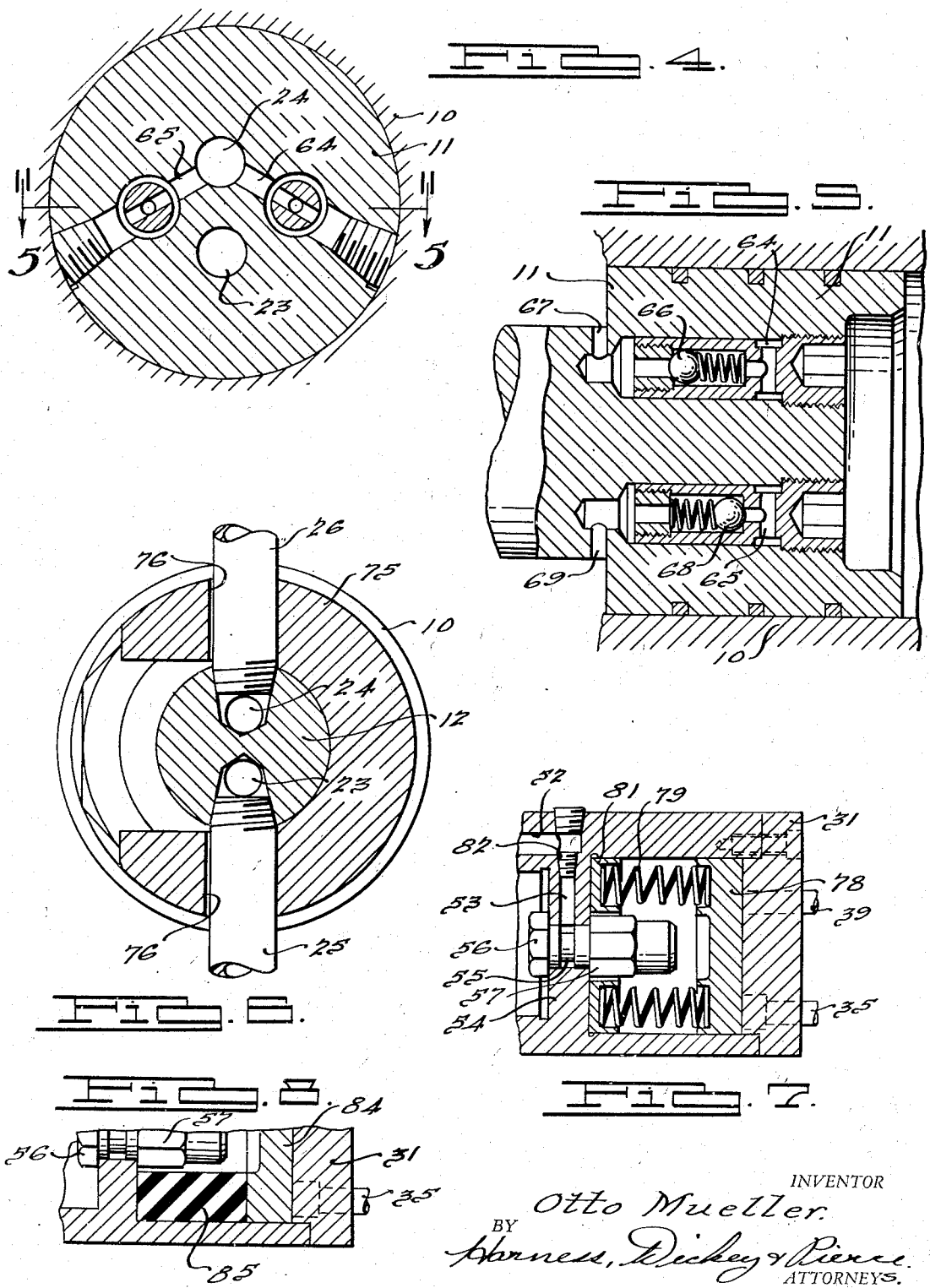
INVENTOR
Otto Mueller.
BY
Harness, Dickey & Pierce
ATTORNEYS.

Patented July 11, 1944

2,353,488

UNITED STATES PATENT OFFICE 2,353,488

HYDRAULIC PUNCH AND STRIPPER

Otto Mueller, Dearborn, Mich.

Application May 24, 1943, Serial No. 488,127

18 Claims. (Cl. 164—95)

This invention relates to hydraulic punching and stripping devices and particularly to a unit device for operating metal working tools and a pressure plate for holding and stripping the material from the tool.

The invention embodies a main cylinder having a piston therein on which the cylinder is advanced and retracted. The piston is supported by its protruding end to a rigid member and the cylinder is supported in ways to align the tool carried by the cylinder with that on a rigid support which is parallel to the rigid member. The supports may be so located as to have the piston and cylinder disposed in either horizontal or vertical plane, or in planes at an angle thereto. A head is mounted on the forward end of the cylinder, on which a tool is carried aligned with the tool on the rigid support. A pressure plate is also carried by the head for engaging and holding the workpiece against the stationary tool.

In operation, the cylinder is retracted on the piston, that is to say, moved toward the supported end of the piston and the workpiece is placed in position upon or adjacent to the face of the stationary tool or die member. Fluid is then introduced to the cylinder to move it forwardly on the piston to advance the pressure plate to firmly hold the work against the face of the tool or die member. The movement of the cylinder forces the tool on the cylinder toward the workpiece to perform the punch or die operation thereon.

A second piston is provided at the forward or tool carrying end of the cylinder which abuts the ends of a plurality of pins, which interconnects the piston to the pressure plate. When fluid is admitted to this second cylinder, the piston therein will move relative to the cylinder, after the fluid within the cylinder is connected to tank, and will force the cylinder unit to retract over the first piston, due to the engagement of the second piston with the connecting pins and the pressure plate. This holds the workpiece on the stationary tool or die member while the punch or die member is separated therefrom. This produces the stripping operation of the punch or die member from the workpiece.

Upon reversing the fluid on the two pistons, the first piston will cause the cylinder to retract while the second piston will retract within the cylinder. This permits the retraction of the pressure plate and the separation of the plate and punch or die member from the workpiece and the stationary die member. The workpiece may then be removed and a new workpiece may then be inserted between the tools.

The cylinder is provided with projected flanges which are engaged by gibs to maintain the movement of the cylinder on the axis of the piston and the alignment of the tools with each other.

It is within the purview of this invention to employ a plurality of springs, or a block of rubber to produce the stripping of the punch or die from the work, although the employment of the second piston provides control not embodied in the use of the spring and the rubber elements.

It is to be understood that the device is a complete unit and any number may be employed between a pair of spaced rigid members for producing the operations on workpieces.

While a source of standard pressure may be employed for operating the cylinder on the piston and the second piston within the cylinder, it is contemplated to employ two stages of pressure; one, a reduced pressure of substantially 1000 lbs. per square inch, for moving the cylinder and piston to advanced and retracted positions, and, a second pressure, in the order of 5000 lbs. per square inch, for performing the operation on the workpiece.

Accordingly, the main objects of this invention are: to provide a self-contained ram and punch mechanism, for punching and stripping sheet of material; to provide a cylinder movable upon a stationary piston, having a tool supporting head, which is aligned with a spaced die member against which the work is retained by a pressure plate for holding the workpiece during the forming and stripping operations as the tool is advanced and withdrawn therefrom; to provide a movable cylinder with a pressure plate and a die set which engage and operate on the workpiece as the cylinder is advanced, which cylinder is retracted by a second piston therewithin, which operates against the pressure plate; to provide a hydraulically operated cylinder with resilient means for urging a pressure plate against the workpiece as the cylinder is advanced to operate thereon and for retaining the workpiece in position as the cylinder is moved therefrom; to provide a unit self-contained device which may be supported between two rigid elements, between which the operation on the workpiece is performed; and, in general, to provide a punching device which is simple in construction, positive in operation and economical in manufacture.

Other objects and features of novelty of this invention will be specifically pointed out or will become apparent when referring, for a better understanding of this invention, to the following description taken in conjunction with the accompanying drawings, wherein:

Figure 1 is a sectional view of a punching device embodying features of this invention, taken on the line 1—1 of Figure 2;

Figure 2 is an enlarged sectional view of the structure illustrated in Figure 1, taken on the line 2—2 thereof;

Figure 3 is a sectional view of the structure illustrated in Figure 2, taken on the line 3—3 thereof;

Figure 4 is an enlarged sectional view of the structure illustrated in Figure 1, taken on the line 4—4 thereof;

Figure 5 is a sectional view of the structure illustrated in Figure 4, taken on the line 5—5 thereof;

Figure 6 is an enlarged sectional view of the structure illustrated in Figure 1, taken on the line 6—6 thereof;

Figure 7 is a broken sectional view of a structure, similar to that illustrated in Figure 1, showing a modified form thereof; and Figure 8 is a view of the structure similar to that illustrated in Figure 7, showing a still further form of the invention.

In Figures 1 to 6, inclusive, the self-contained hydraulic operated metal working device is illustrated. The device comprises a cylinder 10 which operates on a piston 11 having a rod 12 secured to a rigid supporting element 13 by a nut 14 and washers 15. A plurality of piston rings 16 seal the peripheral surface of the piston to the wall portion 17 of the cylinder 10. A head 18 is screwed upon the end of the cylinder having a packing 19 in engagement with the piston rod 12 secured in sealed relation by a ring 21, which is movable longitudinally of the rod by a threaded ring 22. The piston rod contains a pair of passageways 23 and 24, which are connected to the passageways 25 and 26.

A fluid is conducted through the passageways 25 and 23 out of the end of the piston 11 into the chamber of the cylinder 10, which is advanced on the piston to the right, as viewed in Fig. 1, toward a die element 27. The element 27 is secured to a fixed support disposed opposite to the supporting element 13 to which the piston rod 12 is attached. The right hand end of the cylinder 10, as illustrated in Figure 1, is provided with a cylinder portion 28, in which a piston 29 is mounted. The forward end of the piston is sealed by a cylinder head 31 to which a movable punch member 32 is secured.

In the device herein illustrated, by way of example, the die element 27 and the punch member 32 are a punch couplet for piercing holes in a sheet of material 33. It is to be understood that the element and member may be a forming die couplet for drawing a piece of material to predetermined form.

The head 31 has a pressure plate 34 movably secured thereto by a plurality of studs 35, which extend through apertures in the head 31 and which are attached to the pressure plate 34 by the screws 37. A spring 38 is disposed over the studs 35 for urging the pressure plate 34 away from the head 31 on the end of the cylinder. A plurality of pins 39 extend through the punch member 32 and the head 31 in position to be engaged by the piston 29, for positively applying a predetermined pressure to the plate 34 to retain the work element 33 against the die element 27 as the cylinder 10 is moved to the right. This movement forces the punches 41 of the punch member 32 through the workpiece 33 to punch the apertures 42 therethrough. The piston 29 is provided with a packing gland 43 comprising the packing material 44, which is compressed by a ring 45, as it is moved toward the packing by a head 46 when a plurality of screws 47 are tightened.

It is to be understood that a simple conventional fluid system (not herein illustrated), is employed, device having a reversing valve to reverse the flow of fluid in the conduits 25 and 26. After the punching operation, the flow of fluid in the system is reversed, the fluid in the cylinder 10, on the right hand side of the piston, blows outwardly of the passageways 23 and 25, while fluid is admitted through the passageways 26 and 24 to the outlet opening 48 through the side of the piston rod 12. A plug 49 closes the end of the passageway 24 at the head end of the piston. The fluid flows from the passageway 48 into the passageway 51, through the passageway 52 in the wall of the cylinder 10 and through the passageway 53 in the partition 54, which separates the piston 11 and 29. The passageway 53 is joined to the passageway 55 in the plug 56 which is secured to the partition by the cup-shaped nut 57. A check valve 58 is mounted in the plug 56 for bodily movement to the right, when fluid is admitted into the passageway 55, away from the valve seat 59. This permits the flow of fluid through the passageway 61 on the wall of the check valve out through the aperture 62 in the nut 57.

The fluid builds up a pressure within the cylinder portion 28 which moves the piston 29 relative to the cylinder portion 10. Since the piston 29 is in contact with the pins 39 for forcing the pressure plate 34 against the workpiece 33 and die element 27, the reaction to the pressure on the piston 29 moves the cylinder 10 to the left, thereby moving the punch member 32 along therewith. This withdraws the punches 41 from the workpiece 33 in a stripping operation, which moves the cylinder, the pistons and workpiece into the relationship illustrated in Figure 1.

Referring to Figures 4 and 5, it will be seen that the fluid in the passageway 24 is also directed into the passageway 64 and 65 in the piston 11. The pressure in the passageway 64 is sealed by the ball check 66 from the passageway 67 on the left hand of the piston, as viewed in Fig. 5. The fluid in the passageway 65 passes around the ball check 68 into the passageway 69 and recess 71 to thereby assist the pressure, which is built up against the piston 29, in moving the cylinder 10 to the left. When the cylinder 10 is advanced to the right, as illustrated in Figure 1, through the introduction of fluid ahead of the piston 11, the fluid trapped in the recess 71 between the head 18 and the piston 11 will pass around the ball check 66 into the passageways 64 and 24 and out through the conduit 26 to tank.

The ball check valve 58 in the plug 56 permits the flow of fluid in the cylinder portion 28 out through the passageways 55, 53, 52, 51, 48, 24 and the conduit 26 to tank. This occurs when the cylinder 10 is advanced to the right to move the plate 34 and the workpiece 33 against the die element 27. A predetermined spring pressure is applied to the ball to control the amount of pressure which is exerted by the piston 29 on the plate 34 during the punching or forming operation.

The cylinder 10 is provided with ways 73 which operate in gibs 74 to accurately align the cylinder 10 with the die element 27. It is to be understood that the ways and gibs may be disposed in a horizontal, vertical, or in any plane which is most convenient to perform the operation on the workpiece. For regulating the movement of the cylinder 10 on the piston rod 12, as illustrated in Figures 1 and 6, a U-shaped collar 75 may be inserted over the piston rod 12 having slots 76 in which the conduits 26 and 27 extend. A locking screw 77 may be employed for securing the collar in position on the rod. The collar limits the movement of the cylinder 10 to the left so that for thin workpieces a wide collar 75 would be employed, while on thick workpieces, or deep draw dies, a thinner collar would be utilized.

In operation, the workpiece 33 is placed between the pressure plate 34 and the die element 27 when the cylinder 10 has been moved to the left, as viewed in Figure 1. Fluid is admitted to the conduit 25 while the conduit 26 conducts fluid away from the device. The fluid is delivered through the piston 11 to advance the cylinder 10 to the right to move the pressure plate 34 into engagement with the work element 33 with a pressure regulated by the check valve 58, as above mentioned. Piston 29 is retracted by the pins 39 as the cylinder 10 continues to advance to the right. Toward the end of the cylinder movement, the punches 41 are forced through the workpiece 33 until the forward end of the head 18 contacts the left hand of the piston 11. Thereafter the flow of fluid is reversed in the conduits 25 and 26, the inlet conduit 26 admitting fluid to the passageways 24, 48, 51, 52, 53, 55, about the check valve 58 into the passageway 61 and aperture 62 into the cylinder portion 28. The fluid ahead of the piston 11 is conducted through the passageway 23 and conduit 25 away from the device.

The pressure built up within the cylinder portion 28 forces the cylinder 10 to the left due to the reaction of the piston 29 against the pins 39 and pressure plate 34. This strips the punches 41 from the workpiece 33. The fluid in the passageway 24 also passes around the ball check 68 into the recess 71 to the left hand side of the piston 11, which provides pressure for assisting in moving the cylinder 10 to the left, until the passageway 48 is connected to the recess 71. Fluid from the passageway 24 delivered to the recess 71 produces the final retraction of the cylinder and pressure plate 34 from the workpiece 33. The workpiece 33 is then removed to permit a new workpiece to be inserted in position to be immediately operated upon. It is to be understood that when the cylinder 10 is advanced to the right, the fluid in the space 71 will pass outwardly of the device through the passageways 48 and 24 and conduit 26 and when the passageway 48 is sealed off from direct communication with the space 71, that the trapped fluid will pass through the ball check 66 into passageways 64 and 24 to the conduit 26 and tank.

In Figure 7 a spring pressed plate 78 is illustrated, employed in place of the piston 29. The plate 28 abuts the plurality of pins 39 to produce a predetermiied pressure thereon supplied by the plurality of springs 79 nested in a plate 81. A plug 82 seals the passageway 52 from the passageway 53. With this arrangement, a predetermined pressure will be applied to the pressure plate 34 by the action of the springs 79 on the plate 78 and the plurality of pins 39. This same pressure will be available to hold the plate 34 against the workpiece 33 during the stripping operation, as the cylinder 10 is moved to the left by the fluid entering the conduit 26, passageways 24 and 65 through the ball check 68 and passageway 69 into the recess 71 which produces the movement of cylinder 10 to the left. After the springs have expanded the full amount, the die element and pressure plate 34 move to the left along with the cylinder 10 to release the workpiece 33, which may then be removed.

In Figure 8, a similar construction is illustrated, wherein a pressure plate 84 is substituted for the pressure plate 78 and an annular block of rubber is substituted for the springs 79. The rubber produces the force applied through the pins 39 on the pressure plate 34, for holding the workpiece 33 in position against the die element 27 before, during and after the punching operation. The rubber provides the pressure for stripping the punches 41 from the workpiece, when the cylinder 10 is moved to the left by the fluid delivered to the recess 71 as recited hereinabove.

With the hydraulic device herein illustrated and described, a complete punching or forming operation may be performed by the device, when supported between a pair of rigid elements, thereby eliminating the entire machines heretofore required to produce such punching and forming operations. It will be understood that any number of the devices may be supported between the rigid elements so that a large number of operations may be performed by the plurality of devices in a very small space operated from a remote source of fluid pressure. This may be a single source, of say 1000 lbs. pressure, which would produce the complete operating cycle for punching or forming the workpiece. Where the workpiece is of heavy material, requiring greater pressures, which heretofore required large machines and rams, a high and low pressure supply is preferably provided. The movement of the cylinder is produced under a low pressure, of say 1000 lbs., while the actual work—that of punching or forming the workpiece—is performed under a high pressure, such as 5000 lbs. An accumulator system may be employed wherein the two stages of pressure are provided to operate one or a plurality of the devices thereby eliminating separate supply units and the large machines required to produce sufficient pressure to perform the punching or drawing operation.

What is claimed is:

1. A hydraulic device embodying a self-contained unit having a movable work performing element containing a cylinder portion, a piston within the cylinder portion on which the element is moved, a second cylinder portion on the opposite end of the element, a second piston in said second cylinder portion, resilient means urging said second piston toward said end of the element, a pressure plate movably supported on the end of the element, and means interconnecting the pressure plate to said second piston for applying a predetermined pressure thereto.

2. A hydraulic device embodying a self-contained unit having a movable work performing element containing forward and rearward cylinder portions, a piston within the rearward cylinder portion on which the element is moved, a second piston in said forward cylinder portion, a head on said forward cylinder portion, a pressure plate movably supported on the forward end of the element, means interconnecting the pressure plate to said second piston for applying a predetermined pressure thereto, a pair of space supports, means for attaching the first said piston to one of the supports, and work performing members secured to the other support and to said head in aligned relation to each other.

3. A hydraulic device embodying a self-contained unit having a movable work performing element containing forward and rearward cylinder portions, a piston within the rearward cylinder portion on which the element is moved, a second piston in said forward cylinder portion, a pressure plate movably supported on the forward end of the element, means interconnecting the pressure plate to said second piston for applying a predetermined pressure thereto, and guide means for supporting and guiding said element.

4. A hydraulic device embodying a self-contained unit having a movable work performing element containing forward and rearward cylinder portions, a piston within the rearward cylinder portion on which the element is moved, a second piston in said forward cylinder portion, fluid delivering means for urging said second piston toward the forward end of the element, a pressure plate movably supported on the forward end of the element, and means interconnecting the pressure plate to said second piston for applying a predetermined pressure thereto.

5. A hydraulic device embodying a self-contained unit having a movable work performing element containing forward and rearward cylinder portions, a piston within the rearward cylinder portion on which the element is moved, a second piston in said forward cylinder portion, a spring for urging said second piston toward the forward end of the element, a pressure plate movably supported on the forward end of the element, and means interconnecting the pressure plate to said second piston for applying a predetermined pressure thereto.

6. A hydraulic device embodying a self-contained unit having a movable work performing element containing forward and rearward cylinder portions, a piston within the rearward cylinder portion on which the element is moved, a second piston in said forward cylinder portion, resilient material within said forward cylinder portion for urging said second piston toward the forward end of the element, a pressure plate movably supported on the forward end of the element, and means interconnecting the pressure plate to said second piston for applying a predetermined pressure thereto.

7. In a hydraulic device embodying a self-contained unit having a movable work performing element containing forward and rearward cylinder portions, a piston within said rearward cylinder portion on which the element is moved, a head on the end of the forward cylinder portion, a work performing member supported on said head, a pressure plate movably supported on said head forwardly of said work performing member, a piston within said forward cylinder portion, means for urging said second piston towards said head, and movable means joining said pressure plate to said second piston through said head.

8. In a hydraulic device embodying a self-contained unit having a movable work performing element containing forward and rearward cylinder portions, a piston within said rearward cylinder portion on which the element is moved, a head on the end of the forward cylinder portion, a work performing member supported on said head, a pressure plate movably supported on said head forwardly of said work performing member, a second piston within said forward cylinder portion, means for urging said second piston towards said head, movable means joining said pressure plate to said second piston through said head, spaced supporting members, means supporting the first said piston on one of said supporting members, and a second work performing member supported on said other supporting member.

9. In a hydraulic device embodying a self-contained unit having a movable work performing element containing forward and rearward cylinder portions, a piston within said rearward cylinder portion on which the element is moved, a head on the end of the forward cylinder portion, a work performing member supported on said head, a pressure plate movably supported on said head forwardly of said work performing member, a piston within said forward cylinder portion, means for urging said second piston towards said head, movable means joining said pressure plate to said second piston through said head, spaced supporting members, means supporting the first said piston on one of said members, a second work performing member supported on said other supporting member, and guide means for said work performing element for maintaining said work performing members in accurate aligned relation.

10. In a hydraulic device embodying a self-contained unit having a movable work performing element containing forward and rearward cylinder portions, a piston within said cylinder portion on which the element is moved, a head on the end of the forward cylinder portion, a work performing member supported on said head, a pressure plate movably supported on said head forwardly of said work performing member, a piston within said forward cylinder portion, means for urging said second piston towards said head, movable means joining said pressure plate to said second piston through said head, spaced supporting elements, a projecting stem on the first said piston by which it is supported on one of said supporting elements, a second work performing member supported on said other supporting element, and a slotted collar extending over said stem for limiting the movement of the work performing element on the piston.

11. In a self-contained work performing device, a piston having a stem attached to a support, a cylindrical element having a partition providing a rearward cylinder portion for receiving said piston and a forward cylinder portion on the work performing end thereof, a second piston in said forward cylinder portion, means providing a pressure to said second cylinder for urging it toward the forward end of the element, a head on the end of the forward cylinder portion, a work performing member attached to said head, a movable pressure plate forwardly of said head and work performing member, movable means interconnecting said second piston and said pressure plate, and a second work performing member supported in aligned relation to the work supporting member on said head.

12. In a self-contained work performing device, a piston having a stem attached to a support, a cylindrical element having a partition for providing a rearward cylinder portion for receiving said piston and a forward cylinder portion on the work performing end thereof, a second piston in said forward cylinder portion, means for delivering a fluid to said forward cylinder portion for urging the piston toward the work end of the element, a head on the forward end of the cylindrical element, a work performing member attached to said head, a movable pressure plate forwardly of said head and work performing member, movable means interconnecting said second piston and said pressure plate, a second work performing member supported in aligned relation to the work supporting member secured to said head, means for conducting a fluid through said first piston for moving said cylindrical element to relatively move said work performing members toward each other to perform the operation on the workpiece.

13. In a stationary work supporting element, a stationary piston, a movable element having a rearward cylinder encompassing said piston and a forward cylinder, a second piston in said forward cylinder, a work performing member carried on the forward end of said movable element, a pressure plate also carried by said movable member forwardly of said work performing member, movable means operated by said second piston for applying a pressure to said pressure plate, a fluid system for moving said movable element on said first piston, a fluid system for applying a predetermined pressure to said second piston for loading said pressure plate a predetermined amount, and means for reversing the fluid system for applying a pressure on said second piston for moving the movable element and work performing member away from the pressure plate.

14. In a stationary work supporting element, a stationary piston, a movable element having a rearward cylinder encompassing said piston and a forward cylinder, a second piston in said forward cylinder, a work performing member carried on the forward end of said movable element, a pressure plate also carried by said movable member forwardly of said work performing member, movable means operated by said second piston for applying a pressure to said pressure plate, a fluid system for moving said movable element on said first piston, a fluid system for applying a predetermined pressure to said second piston for loading said pressure plate a predetermined amount, means for reversing the fluid system for applying a pressure on said second piston for moving the movable element and work performing member away from the pressure plate, and means in said fluid system for conducting fluid back of said first piston for further moving said movable element on said first piston.

15. In a stationary work supporting element, a stationary piston, a movable element having a rearward cylinder encompassing said piston and a forward cylinder, a second piston in said forward cylinder, a work performing member carried on the forward end of said movable element, a pressure plate also carried by said movable member forwardly of said work performing member, movable means operated by said second piston for applying a pressure to said pressure plate, a fluid system for moving said movable element on said first piston, a fluid system for applying a predetermined pressure to said second piston for loading said pressure plate a predetermined amount, means for reversing the fluid system for applying a pressure on said second piston for moving the movable element and work performing member away from the pressure plate, means in said fluid system for conducting fluid back of said first piston for further moving said movable element on said first piston. and a removable stop element for limiting the travel of the movable element during said last movement.

16. In a device for performing an operation on a workpiece, spaced supports, a piston having a stem secured to one of said supports, a work performing element having a cylinder encompassing said piston, a partition in said cylinder providing a second cylinder on the work performing end of said element, a piston in the said second cylinder, a head on the end of said second cylinder, a work performing member on said head, a pressure plate forwardly of said work performing member and movably secured to said head, operating means extending through said head and engaging said pressure plate and second piston, a second work performing member on the other of said spaced supports aligned with said work performing member carried by said head, means for moving said work performing element on said first piston, and means applying a predetermined pressure to said second piston.

17. In a device for performing an operation on a workpiece, spaced supports, a piston having a stem secured to one of said supports, a work performing element having a cylinder encompassing said piston, a partition in said cylinder providing a second cylinder on the work performing end of said element, a piston in the said second cylinder, a head on the end of said second cylinder a work performing member on said head, a pressure plate forwardly of said work performing member and movably secured to said head, operating means extending through said head and engaging said pressure plate and second piston, a second work performing member on the other of said spaced supports aligned with said work performing member carried by said head, means for moving said work performing element on said first piston, means applying a predetermined pressure to said second piston, said means embodying a flow of fluid, means for reversing said flow of fluid to apply pressure on said second piston for moving said work performing element on said first piston and said work performing member attached to the head relative to said pressure plate, and means thereafter for moving said work performing element on said first piston to its initial position.

18. In a device for performing an operation on a workpiece, spaced supports, a piston having a stem secured to one of said supports, a work performing element having a cylinder encompassing said piston, a partition in said cylinder providing a second cylinder on the work performing end of said element, a piston in the said second cylinder, a head on the end of said second cylinder, a work performing member on said head, a pressure plate forwardly of said work performing member and movably secured to said head, operating means extending through said head and engaging said pressure plate and second piston, a second work performing member on the other of said spaced supports aligned with said work performing member carried by said head, means for moving said work performing element on said first piston, means applying a predetermined pressure to said second piston, said means embodying a flow of fluid, means for reversing said flow of fluid to apply pressure on said second piston for moving said work performing element on said first piston and said work performing member attached to the head relative to said pressure plate, means thereafter for moving said work performing element on said first piston to its initial position, and a removable collar on said stem for limiting the last said movement of the work performing element on said first piston.

OTTO MUELLER.